US010354140B2

United States Patent
Guenter et al.

(10) Patent No.: US 10,354,140 B2
(45) Date of Patent: Jul. 16, 2019

(54) VIDEO NOISE REDUCTION FOR VIDEO AUGMENTED REALITY SYSTEM

(71) Applicant: Microsoft Technology Licensing, LLC, Redmond, WA (US)

(72) Inventors: Brian K. Guenter, Redmond, WA (US); Ran Gal, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/421,150

(22) Filed: Jan. 31, 2017

(65) Prior Publication Data

US 2018/0218217 A1    Aug. 2, 2018

(51) Int. Cl.
| | |
|---|---|
| *G06F 3/01* | (2006.01) |
| *G06K 9/00* | (2006.01) |
| *G06K 9/46* | (2006.01) |
| *G06K 9/62* | (2006.01) |

(52) U.S. Cl.
CPC ......... *G06K 9/00671* (2013.01); *G06F 3/013* (2013.01); *G06K 9/00335* (2013.01); *G06K 9/4671* (2013.01); *G06K 9/6201* (2013.01); *G06K 2009/4666* (2013.01)

(58) Field of Classification Search
None
See application file for complete search history.

(56) References Cited

U.S. PATENT DOCUMENTS

| | | | | |
|---|---|---|---|---|
| 5,604,856 A | * | 2/1997 | Guenter | ................. G06T 5/002 345/473 |
| 6,193,660 B1 | * | 2/2001 | Jackson | ................... A61B 8/00 600/443 |
| 6,252,989 B1 | | 6/2001 | Geisler et al. | |
| 6,340,994 B1 | | 1/2002 | Margulis et al. | |
| 6,462,768 B1 | * | 10/2002 | Oakley | ................ G06K 9/0063 348/31 |
| 6,549,215 B2 | | 4/2003 | Jouppi | |
| 7,148,860 B2 | | 12/2006 | Kooi et al. | |
| 7,499,594 B2 | | 3/2009 | Kortum et al. | |

(Continued)

OTHER PUBLICATIONS

Lavalle, Steven M., "The Physiology of Human Vision", In Publication of University of Illinois, 2015, 17 pages.

(Continued)

*Primary Examiner* — Jason A Pringle-Parker
(74) *Attorney, Agent, or Firm* — Merchant & Gould

(57) ABSTRACT

Video noise reduction for a video augmented reality system is provided. A head mounted display includes a display unit; a camera for generating frames of display data. A frame store is provided for storing previous frames of displayed information that was sent to the display unit; and a motion processor is provided in communication with the camera, display unit, and the frame store. The motion processor is operable to: identify an area of interest in a current frame of display data; match the area of interest to similar areas in previous frames stored in the frame store; rotate and translate the matched areas of interest from the one or more previous frames stored in the frame store to match the area of interest in the current frame; and average the prior matched areas of interest with the current area of interest to generate a displayed area of interest.

20 Claims, 6 Drawing Sheets

(56) References Cited

U.S. PATENT DOCUMENTS

| | | |
|---|---|---|
| 7,542,090 B1 | 6/2009 | Merchant |
| 7,872,635 B2 | 1/2011 | Mitchell |
| 8,223,024 B1 | 7/2012 | Petrou |
| 8,379,915 B2* | 2/2013 | Sharon .................... G06T 7/246 |
| | | 382/103 |
| 8,401,081 B2 | 3/2013 | Doser |
| 8,872,910 B1 | 10/2014 | Vaziri |
| 8,885,882 B1 | 11/2014 | Yin et al. |
| 8,937,771 B2 | 1/2015 | Robbins |
| 9,030,583 B2 | 5/2015 | Gove et al. |
| 9,094,677 B1 | 7/2015 | Mendis et al. |
| 9,366,862 B2 | 6/2016 | Haddick et al. |
| 9,377,852 B1 | 6/2016 | Shapiro et al. |
| 10,298,840 B2 | 5/2019 | Guenter |
| 2002/0063726 A1 | 5/2002 | Jouppi |
| 2003/0198393 A1 | 10/2003 | Berstis |
| 2004/0102713 A1 | 5/2004 | Dunn |
| 2004/0130649 A1 | 7/2004 | Lee |
| 2004/0247167 A1* | 12/2004 | Bueno ....................... G06T 1/20 |
| | | 382/132 |
| 2005/0007453 A1 | 1/2005 | Ahiska |
| 2005/0017923 A1 | 1/2005 | Kooi et al. |
| 2005/0018911 A1 | 1/2005 | Deever |
| 2005/0096543 A1* | 5/2005 | Jackson ................. A61B 8/488 |
| | | 600/441 |
| 2006/0221067 A1* | 10/2006 | Kim ....................... G06F 21/84 |
| | | 345/204 |
| 2007/0177239 A1 | 8/2007 | Tanijiri et al. |
| 2008/0002262 A1* | 1/2008 | Chirieleison ...... G02B 27/0093 |
| | | 359/630 |
| 2008/0247620 A1* | 10/2008 | Lewis ................. G02B 27/017 |
| | | 382/128 |
| 2009/0040308 A1 | 2/2009 | Temovskiy |
| 2009/0116688 A1 | 5/2009 | Monacos et al. |
| 2009/0147126 A1 | 6/2009 | Miyoshi et al. |
| 2009/0153730 A1* | 6/2009 | Knee ..................... G06T 3/0012 |
| | | 348/445 |
| 2009/0175535 A1 | 7/2009 | Mattox |
| 2010/0090929 A1 | 4/2010 | Tsujimoto |
| 2010/0142778 A1* | 6/2010 | Zhuo ......................... G06T 5/50 |
| | | 382/128 |
| 2012/0105310 A1 | 5/2012 | Sverdrup et al. |
| 2012/0146891 A1 | 6/2012 | Kalinli |
| 2012/0176296 A1 | 7/2012 | Border et al. |
| 2012/0300112 A1 | 11/2012 | Natsume |
| 2013/0050485 A1* | 2/2013 | Tiana ...................... H04N 7/18 |
| | | 348/144 |
| 2013/0125155 A1 | 5/2013 | Bhagavathy et al. |
| 2013/0169683 A1 | 7/2013 | Perez et al. |
| 2013/0285885 A1 | 10/2013 | Nowatzyk et al. |
| 2014/0085505 A1 | 3/2014 | Asuka et al. |
| 2014/0125785 A1 | 5/2014 | Na et al. |
| 2014/0218468 A1 | 8/2014 | Gao et al. |
| 2014/0247277 A1 | 9/2014 | Guenter et al. |
| 2014/0247286 A1 | 9/2014 | Chi |
| 2014/0266990 A1 | 9/2014 | Makino et al. |
| 2014/0268360 A1 | 9/2014 | Ellsworth |
| 2014/0361977 A1 | 12/2014 | Stafford et al. |
| 2014/0375680 A1 | 12/2014 | Ackerman et al. |
| 2015/0042814 A1 | 2/2015 | Vaziri |
| 2015/0235453 A1 | 8/2015 | Schowengerdt et al. |
| 2016/0034032 A1 | 2/2016 | Jeong |
| 2016/0080653 A1* | 3/2016 | Kim ........................ G06T 5/002 |
| | | 348/216.1 |
| 2016/0109712 A1 | 4/2016 | Harrison et al. |
| 2016/0187969 A1 | 6/2016 | Larsen et al. |
| 2016/0246055 A1 | 8/2016 | Border et al. |
| 2016/0320559 A1 | 11/2016 | Richards |
| 2016/0328030 A1 | 11/2016 | Kimura et al. |
| 2017/0359510 A1* | 12/2017 | Lane ....................... G06T 5/006 |
| 2018/0035058 A1* | 2/2018 | Thumpudi ............. H04N 5/265 |
| 2018/0075653 A1 | 3/2018 | Schillings |
| 2018/0217383 A1 | 8/2018 | Guenter |
| 2018/0218661 A1 | 8/2018 | Guenter |
| 2018/0220068 A1 | 8/2018 | Guenter |

OTHER PUBLICATIONS

Guenter, et al., "Foveated 3D Graphics", In Journal of ACM Transactions on Graphics, vol. 31, Issue 6, Nov. 2012, 10 pages.

Poletti, et al., "Microscopic Eye Movements Compensate for Non-homogeneous Vision within the Fovea", In Journal of Current Biology, vol. 23, Issue 17, Sep. 9, 2013, pp. 1-11.

Guenter, et al., "Supplement to Foveated 3D Graphics: User Study Details", Retrieved from <<https://www.microsoft.com/en-us/research/wp-content/uploads/2012/11/userstudy07.pdf>>, Jan. 1, 2012, 4 Pages.

Jin, et al., "Analysis and Processing of Pixel Binning for Color Image Sensor", In EURASIP Journal on Advances in Signal Processing, vol. 1, Jun. 21, 2012, 22 Pages.

Rolland, Jannick, et al., "Head-Mounted Display Systems", In Encyclopedia of Optical Engineering, Mar. 2005, 14 Pages.

Stengel, et al., "An Affordable Solution for Binocular Eye Tracking and Calibration in Head-mounted Displays", In Proceedings of the 23rd ACM international conference on Multimedia, Oct. 26, 2015, 10 Pages.

"Non Final Office Action Issued in U.S. Appl. No. 15/421,185", dated May 17, 2018, 23 Pages.

"Non Final Office Action Issued in U.S. Appl. No. 15/421,228", dated Aug. 27, 2018, 23 Pages.

"International Search Report and Written Report issued in PCT Application No. PCT/US2018/016187", dated Aug. 21, 2018, 15 Pages.

"Notice of Allowance" issued in U.S. Appl. No. 15/421,185, dated Oct. 1, 2018, 9 pages.

"Non Final Office Action Issued in U.S. Appl. No. 15/421,252", dated Nov. 1, 2018, 18 Pages.

"Final Office Action Issued in U.S. Appl. No. 15/421,228", dated Mar. 7, 2019, 21 Pages.

"Final Office Action Issued in U.S. Appl. No. 15/421,252", dated May 16, 2019, 19 Pages.

\* cited by examiner

MOBILE COMPUTING DEVICE

VIDEO NOISE REDUCTION FOR VIDEO AUGMENTED REALITY SYSTEM

BACKGROUND

Augmented reality is becoming a greater part of the computer user experience. Through augmented reality, a computer user wears a head mounted display that projects computer generated images onto a real-world scene, thus augmenting the scene with computer generated information. This information can be in the form of graphics or text. Cameras mounted on the head mounted display pick up the images of what the user is looking at in the real world. As a computer user does not keep his head still during use of augmented reality head mounted displays ("HMDs"), images being projected onto the display units within an HMD will move around. But cameras within the HMD often have small pixel receptor areas and slow shutter speeds. Therefore, motion blur is often a problem when using HMD units with typical slow shutter and small pixel size cameras. This motion blur detracts from the reality when using HMD units for augmented reality.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to a head mounted display unit for video noise reduction in a video augmented reality system. The head mounted display, includes: a display unit; a camera for generating frames of display data; a frame store for storing previous frames of displayed information that was sent to the display unit; and a motion processor in communication with the camera, display unit, and the frame store. The motion processor is operable to: identify an area of interest in a current frame of display data; match the area of interest to similar areas in one or more previous frames stored in the frame store; rotate and translate the matched areas of interest from the one or more previous frames stored in the frame store to match the area of interest in the current frame; and average the prior matched areas of interest with the current area of interest to generate a displayed area of interest.

Additional aspects include a system including a computing device. The computing device includes: at least one processing device; and at least one computer readable data storage device storing instructions that, when executed by the at least one processing device are operative to provide: receiving an image from a camera; determining an area of interest in the image; finding comparable areas of interest in a previous frame; averaging the area of interest in the image with the comparable area of interest in the previous frame; and displaying the averaged area of interest embedded within the image from the camera.

Additional aspects include a method including: receiving a current image from a camera; retrieving from a store previous images that were captured by the camera; determining an area of interest in the current image based on eye tracking information; and averaging the area of interest in the current image with similar areas in the previous images.

Examples are implemented as a method, computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
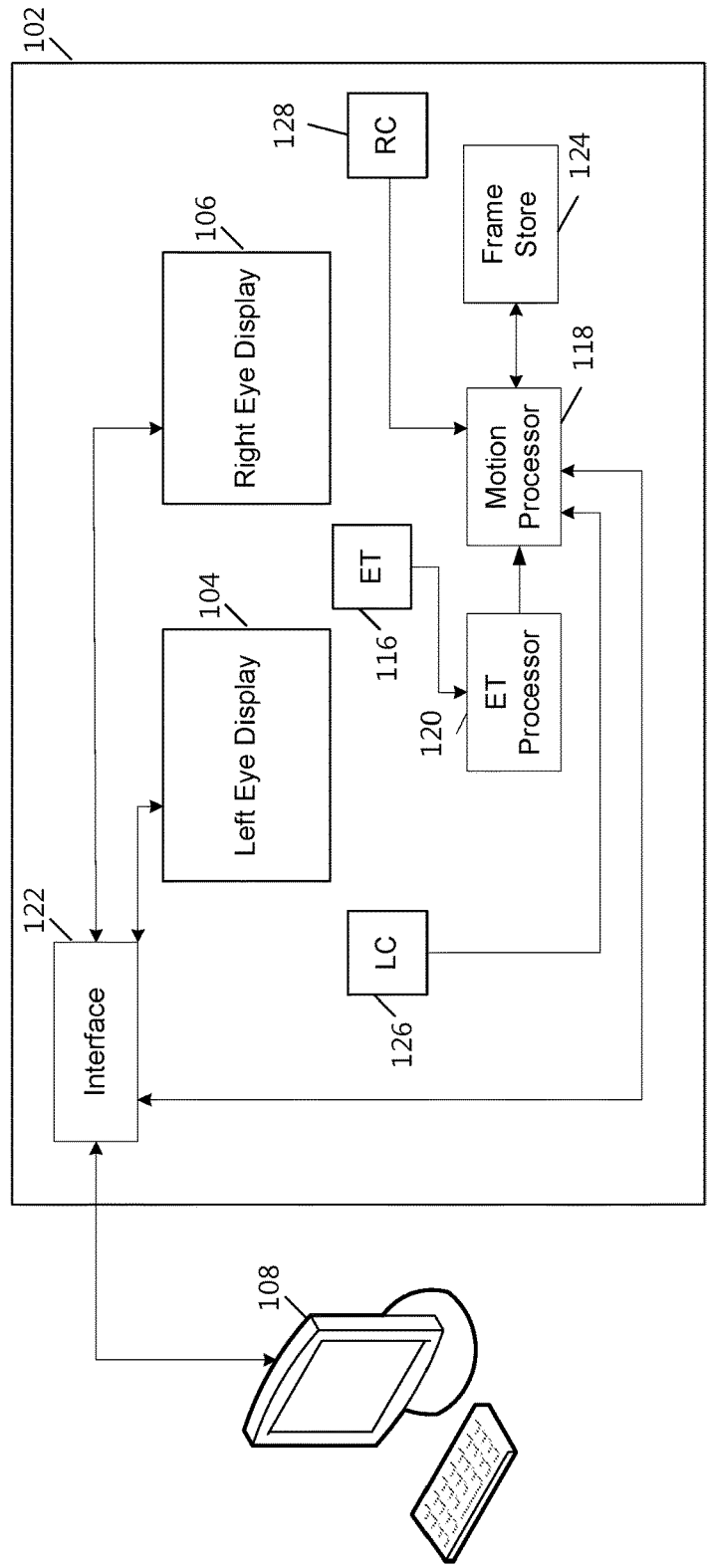
FIG. 1 is a block diagram of an example head mounted display.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method and system for video noise reduction for video augmented reality systems. In augmented reality systems, the shutter speed on the cameras has to be very short in order to avoid motion blur, but the problem is that the cameras and camera sensors on HMDs are often very small. Therefore, very few photons actually reach the sensor in the camera or cameras. So, fast shutter speeds are simply not possible, particularly in indoor, low-light situations. Thus, camera shutter speeds are too long and motion blur sets in. This motion blur significantly detracts from the augmented reality immersion. Images will look noisy, so there is a need to reduce the noisiness of the images. To reduce noisiness requires getting access to more photons.

The present disclosure significantly reduces noisiness and motion blur by averaging together multiple frames of images. The signal to noise ratio goes up according to the square root of the number of frames averaged together. So, for example, averaging ten frames together improves signal to noise ratio by a factor of three. But one cannot simply average whole frames together because doing so would result in ghosting as images move across the display screen. One must compensate for movement of images, both translationally and rotationally. However, doing this for an entire frame is processor intensive and impractical.

The present disclosure solves this issue by using eye tracking technology to focus on where the user of the HMD is looking. A small portion of the image where the user is looking, say a 50×50 pixel region becomes the focus of the averaging. Matches are found for the subject of interest in the 50×50 pixel region for the previous n, for example ten, image frames. Then, only those portions of the previous n images are averaged together to enhance the image quality of the 50×50 pixel region. Those relevant portions are translated and potentially rotated to match one another prior to the averaging being performed. In this way, motion blur is reduced and image quality greatly enhanced for those portions of the image that are actually of interest to the user of the HMD.

Please note that not the entire frame is averaged, it is merely a subset of the frame that is the area of interest that is averaged together across frames. The remainder of the frame displayed is simply the output of a single camera image frame. So a portion of the resulting frame, specifically a 50×50 pixel portion, will be of significantly enhanced noise reduction, while the remainder of the frame will not.

FIG. 1 is a block diagram of an example head mounted display. An HMD 102 (head mounted display) is provided. The HMD 102 includes a Left Eye Display 104 and a Right Eye Display 106. Each of these displays is coupled to an Interface 122 that is coupled to a computer 108. Computer 108 generates any augmented reality information desired to be overlaid on the image picked up by cameras mounted on the HMD 102. In particular, a Left Camera 126 and a Right Camera 128 pick up the image of what the user is looking at and sends this image to a Motion Processor 118. Processor 118 can be, for example, a microprocessor, microcomputer, a digital signal processor, or a graphics processing unit.

Motion Processor 118 is coupled to the Interface 122 through which it is coupled to the Left Eye Display 104 and the Right Eye Display 106. In an alternative embodiment, the Motion Processor 118 may be directly coupled to the displays. The Motion Processor 118 is further coupled to an Eye Tracking Processor 120 that receives eye tracking information from an Eye Tracking Sensor 116. The Eye Tracking Processor 120, in conjunction with the Eye Tracking Sensor 116, determines where the user's eye is looking and feeds that information to the Motion Processor 118.

The Motion Processor 118 is further in communication with a Frame Store 124 that stores the last n frames of images that were fed to the display units. The n frames may be any number, but in an exemplary embodiment of the disclosure, n is equal to ten frames. By having all of this information at its disposal the Motion Processor 118 is able to receive information about where the user's eye is looking, the current left and right camera images, and the last n frames of information sent to the Left Eye Display 104 and the Right Eye Display 106.

The Motion Processor 118 may use this information to average the last n frames of display information with respect to the area at which the user is looking. Typically, this may be a 50×50 pixel area. The Motion Processor 118 will match the current 50×50 pixel area with comparable areas in the previous n frames, rotate and translate the prior 50×50 pixel areas as required, and average these areas together. Thus, a greater number of pixels are used to generate the image, and motion blur and noise is significantly reduced.

In certain embodiments, the Eye Tracking Processor 120, the Motion Processor 118, and the Frame Store 124 may all take place in a single processor or DSP (Digital Signal Processor) and not in discrete units.

The above process and system may also be used in the absence of an eye tracking system 116. In such a system, the center of the screen can be assumed to be the area of interest and the matching, translation, rotation, and averaging functions can be performed based on this 50×50 pixel area in the center of the screen.

Furthermore, while the processing performed is discussed with respect to a motion processor 118 and frame store 124 that is mounted in the HMD 102, these functions could be offloaded to the computer 108 that is in communication with HMD 102.

Figure 2:
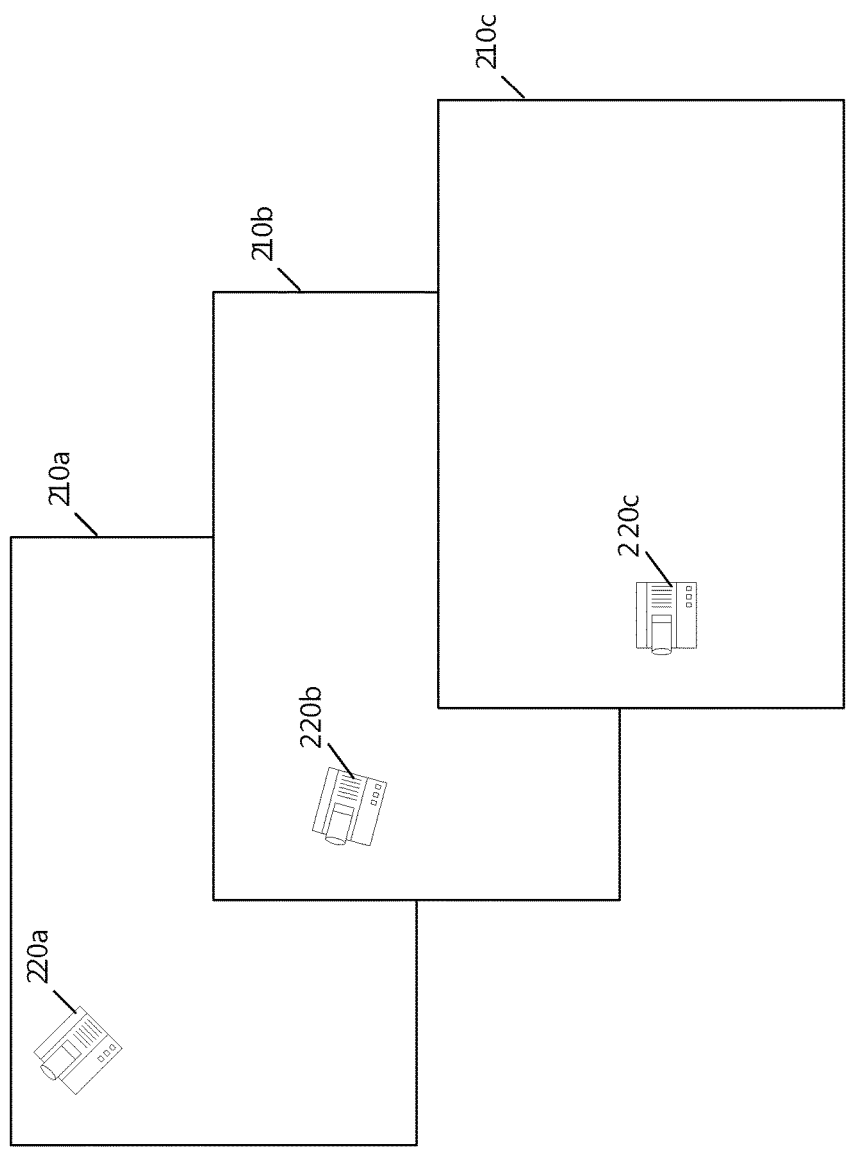
FIG. 2 is an illustration of a series of frames stored in a frame buffer within a head mounted display.

FIG. 2 is an illustration of a series of frames stored in a frame buffer within a head mounted display. The Frame Store 124 will store at least n frames of pixels, typically ten frames. FIG. 2 illustrates three of these frames 210a-c that contain an object of interest, i.e. the object at which the user is looking, shown as device 220a-c. For simplification purposes, only three frames are illustrated in FIG. 2, although often ten frames may be used. The current frame is shown as Frame 210c, and one can see that the object of interest 220c is located on the left side of the frame. However, in our example, the user of the HMD 102 has moved the user's head up over the course of the last few frames, so while the object of interest 220c is currently centered on the left side of the frame 210c, in previous frames 210a and 210b, the object of interest was in the left upper center and the left upper corner. In other words, the object of interest has moved within the frame.

The Motion Processor 118 will identify and match these previous locations of the object of interest 220, translate their position, and average these three 50×50 pixel areas when generating the image to be displayed to the user. Thus significantly more pixels are used to generate the image than would have been used otherwise. It is important to note that if no matches can be found in previous frames (which is not the case in this example) then the averaging function would not be performed.

Figure 3:
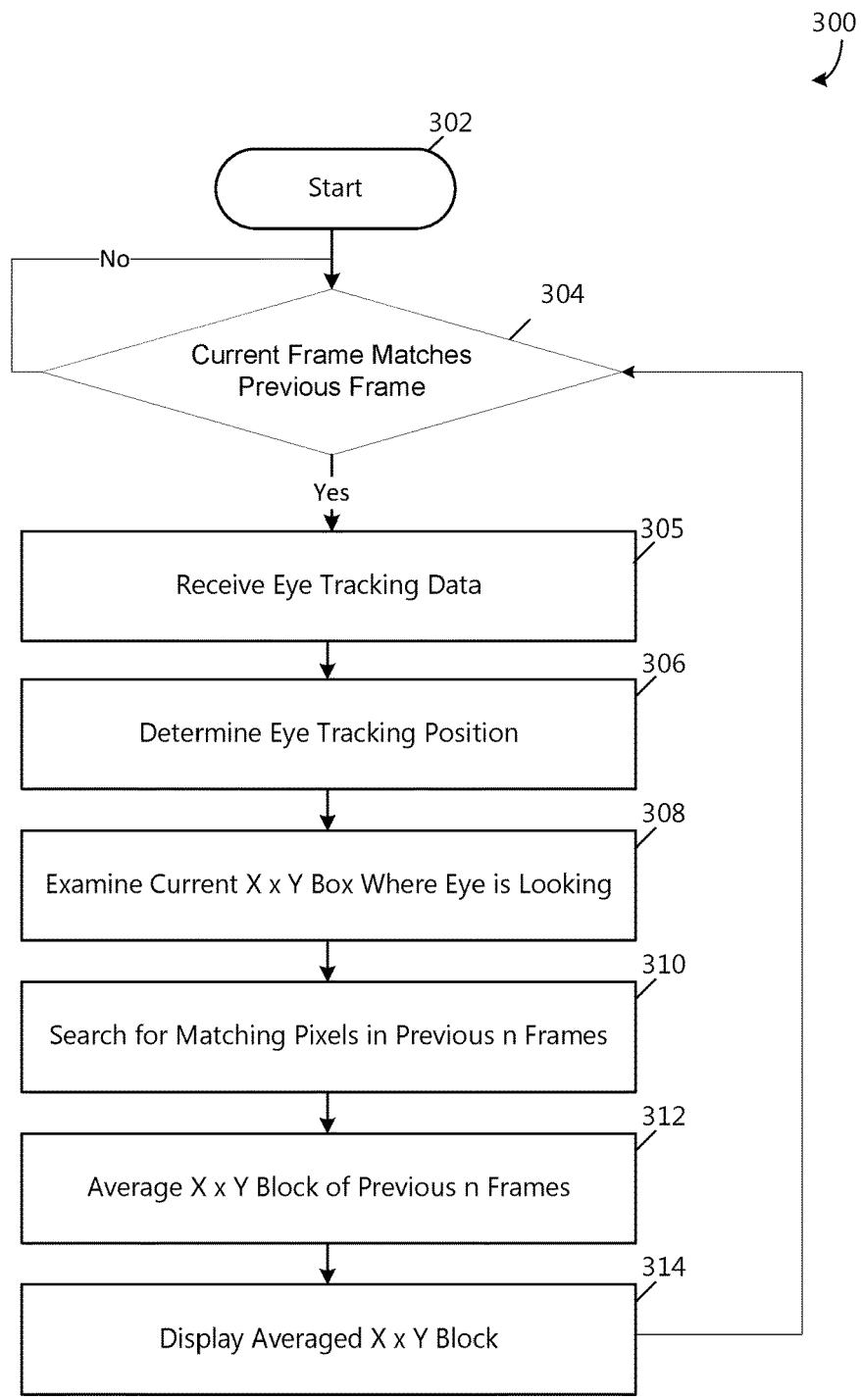
FIG. 3 is a flow chart showing general stages involved in an example method of video noise reduction for a video augmented reality system.

FIG. 3 is a flow chart showing general stages involved in an example method 300 of video noise reduction for a video augmented reality system. Method 300 begins at the Start OPERATION 302. At OPERATION 304 a check is made to determine the quality of the match between the current frame and the previous frame stored in the Frame Store 124. If the frame match is not good, the method 300 waits at OPERATION 304 for a good match. If a good match is made, method 300 proceeds to OPERATION 305 where eye tracking information is received. The eye tracking position is determined at OPERATION 306 and at OPERATION 308 an X×Y box of information is examined where the eye is looking. In an exemplary embodiment, the size of the box is 50×50 pixels. At OPERATION 310 a search is conducted of the previous n frames, where n is typically ten, for pixels matching the X×Y area of interest. These n areas of interest in the n frames are then translated as required, rotated as required, and averaged together at OPERATION 312. Then, at OPERATION 314 this averaged X×Y block is displayed to the end user on the display units of the HMD 102. Method 300 then returns to OPERATION 304.

In alternative embodiments of the disclosure, OPERATION 312 may use a weighted average when averaging the n areas of interest together. For example, more recent frames may be given a higher weight than older frames. Or, frames may be weighted based on the quality of the match between the area of interest in the older frame and the area of interest in the current frame.

The aspects and functionalities described herein may operate via a multitude of computing systems including, without limitation, head mounted displays with and without computer assistance, or head mounted displays in conjunction with desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, according to an aspect, the aspects and functionalities described herein may operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 4:
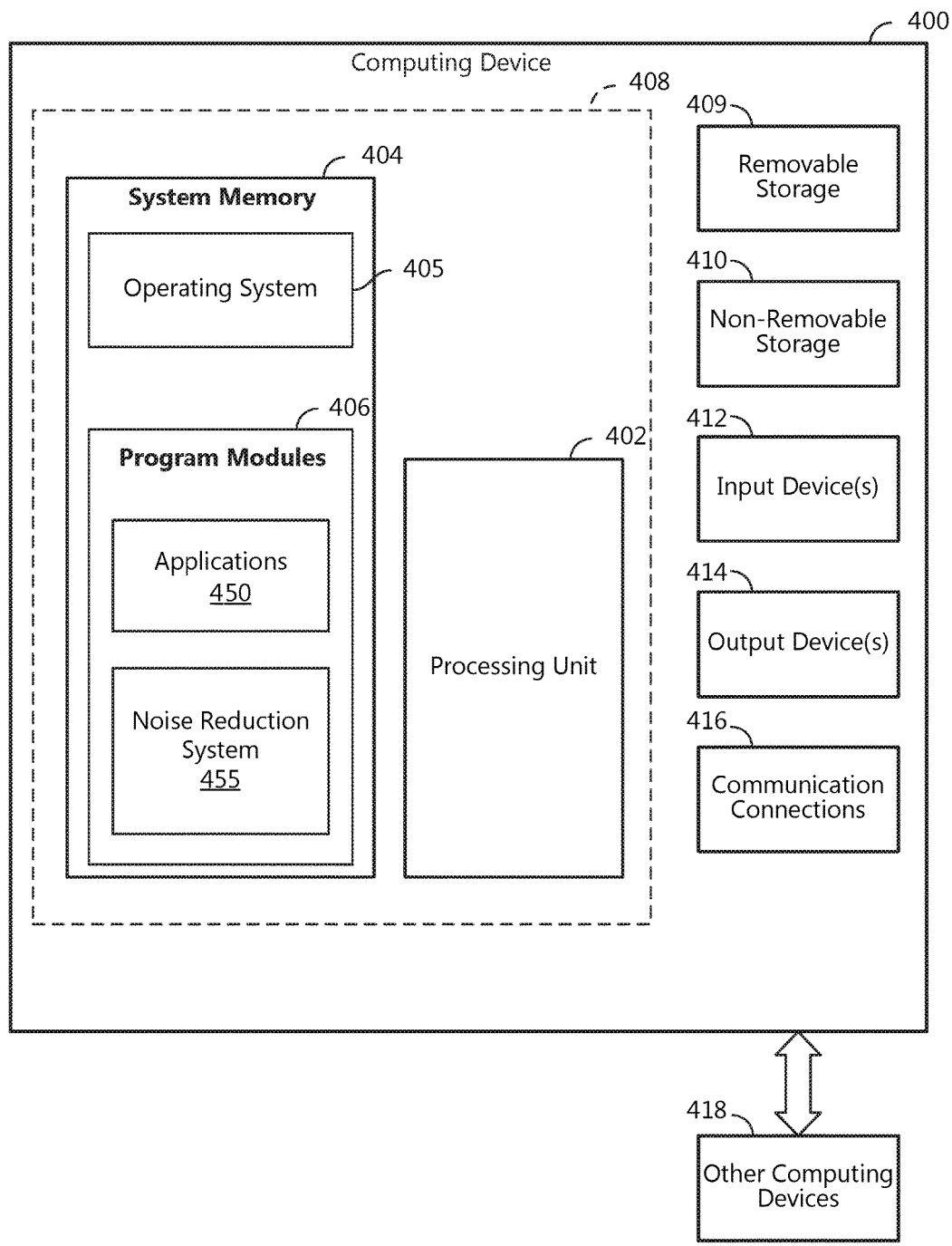
FIG. 4 is a block diagram illustrating example physical components of a computing device.

FIGS. 4 and 5 and the associated descriptions provide a discussion of a variety of operating environments in which examples are practiced. However, the devices and systems illustrated and discussed with respect to FIGS. 4 and 5 are for purposes of example and illustration and are not limiting of a vast number of computing device configurations that are utilized for practicing aspects, described herein.

FIG. 4 is a block diagram illustrating physical components (i.e., hardware) of a computing device 400 with which examples of the present disclosure may be practiced. In a basic configuration, the computing device 400 includes at least one processing unit 402 and a system memory 404. According to an aspect, depending on the configuration and type of computing device, the system memory 404 comprises, but is not limited to, volatile storage (e.g., random access memory), non-volatile storage (e.g., read-only memory), flash memory, or any combination of such memories. According to an aspect, the system memory 404 includes an operating system 405 and one or more program modules 406 suitable for running software applications 450. According to an aspect, the system memory 404 includes the noise reduction system 455. The operating system 405, for example, is suitable for controlling the operation of the computing device 400. Furthermore, aspects are practiced in conjunction with a graphics library, other operating systems, or any other application program, and are not limited to any particular application or system. This basic configuration is illustrated in FIG. 4 by those components within a dashed line 408. According to an aspect, the computing device 400 has additional features or functionality. For example, according to an aspect, the computing device 400 includes additional data storage devices (removable and/or non-removable) such as, for example, magnetic disks, optical disks, or tape. Such additional storage is illustrated in FIG. 4 by a removable storage device 409 and a non-removable storage device 410.

As stated above, according to an aspect, a number of program modules and data files are stored in the system memory 404. While executing on the processing unit 402, the program modules 406 (e.g., micropositioning system 455) perform processes including, but not limited to, one or more of the stages of the method 300 illustrated in FIG. 3. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 4 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 400 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 400 has one or more input device(s) 412 such as a keyboard, a mouse, a pen, a sound input device, a touch input device, etc. The output device(s) 414 such as a head mounted display, speakers, a printer, etc. are also included according to an aspect. The aforementioned devices are examples and others may be used. According to an aspect, the computing device 400 includes one or more communication connections 416 allowing communications with other computing devices 418. Examples of suitable communication connections 416 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. According to an aspect, any such computer storage media is part of the computing device 400. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Figure 5A:
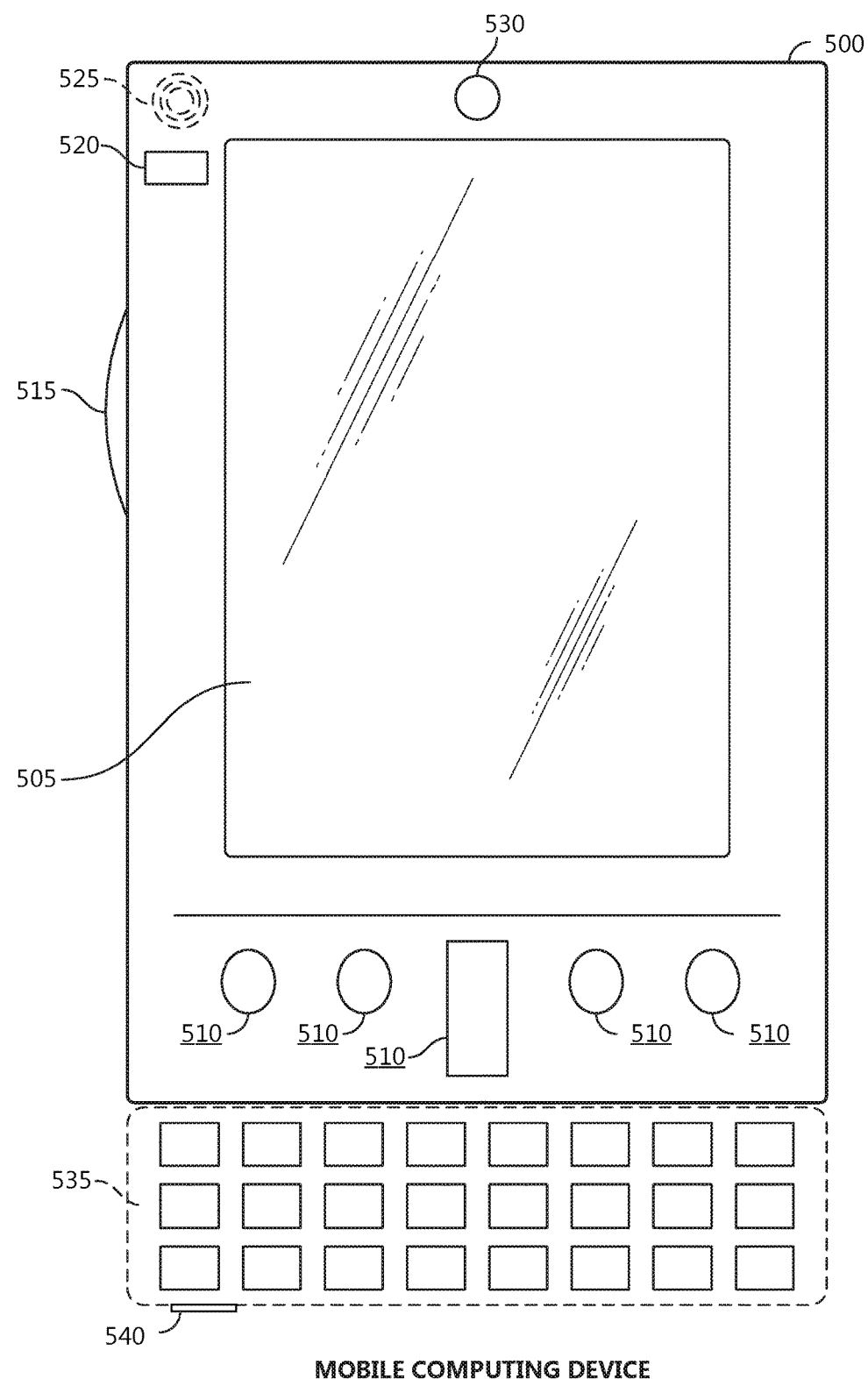
FIGS. 5A and 5B are simplified block diagrams of a mobile computing device.
Figure 5B:
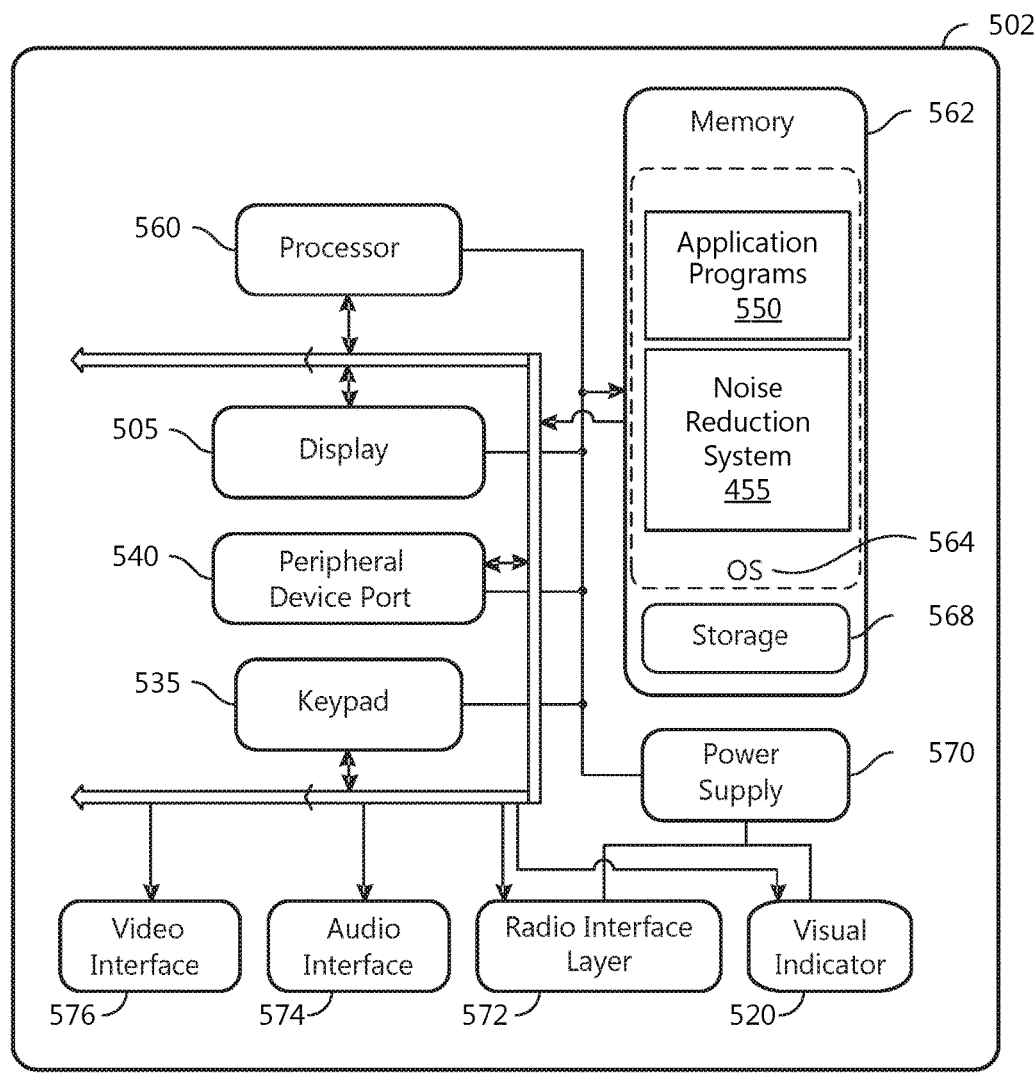

FIGS. 5A and 5B illustrate a mobile computing device 500, for example, a mobile telephone, a smart phone, a tablet personal computer, a laptop computer, and the like, with which aspects may be practiced. With reference to FIG. 5A, an example of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. According to an aspect, the display 505 of the mobile computing device 500 functions as an input device (e.g., a touch screen display). If included, an optional side input element 515 allows further user input. According to an aspect, the side input element 515 is a rotary switch, a button, or any other type of manual input element. In alternative examples, mobile computing device 500 incorporates more or less input elements. For example, the display 505 may not be a touch screen in some examples. In alternative examples, the mobile computing device 500 is a portable phone system, such as a cellular phone. According to an aspect, the mobile computing device 500 includes an optional keypad 535. According to an aspect, the optional keypad 535 is a physical keypad. According to another aspect, the optional keypad 535 is a "soft" keypad generated on the touch screen display. In various aspects, the output elements include the display 505 for showing a graphical user interface (GUI), a visual indicator 520 (e.g., a light emitting diode), and/or an audio transducer 525 (e.g., a speaker). In some examples, the mobile computing device 500 incorporates a vibration transducer for providing the user with tactile feedback. In yet another example, the mobile computing device 500 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 500 incorporates peripheral device port 540, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one example of a mobile computing device. That is, the mobile computing device 500 incorporates a system (i.e., an architecture) 502 to implement some examples. In one example, the system 502 is implemented as a "smart phone" capable of running one or more applications (e.g., browser, e-mail, calendaring, contact managers, messaging clients, games, and media clients/players). In some examples, the system 502 is integrated as a computing device, such as an integrated personal digital assistant (PDA) and wireless phone.

According to an aspect, one or more application programs 550 are loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. According to an aspect, the noise reduction system 455 is loaded into memory 562. The system 502 also includes a non-volatile storage area 568 within the memory 562. The non-volatile storage area 568 is used to store persistent information that should not be lost if the system 502 is powered down. The application programs 550 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500.

According to an aspect, the system 502 has a power supply 570, which is implemented as one or more batteries. According to an aspect, the power supply 570 further includes an external power source, such as an AC adapter or a powered docking cradle that supplements or recharges the batteries.

According to an aspect, the system 502 includes a radio 572 that performs the function of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 550 via the operating system 564, and vice versa.

According to an aspect, the visual indicator 520 is used to provide visual notifications and/or an audio interface 574 is used for producing audible notifications via the audio transducer 525. In the illustrated example, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. According to an aspect, the system 502 further includes a video interface 576 that enables an operation of an on-board camera 530 to record still images, video stream, and the like.

According to an aspect, a mobile computing device 500 implementing the system 502 has additional features or functionality. For example, the mobile computing device 500 includes additional data storage devices (removable and/or non-removable) such as, magnetic disks, optical disks, or tape. Such additional storage is illustrated in FIG. 5B by the non-volatile storage area 568.

According to an aspect, data/information generated or captured by the mobile computing device 500 and stored via the system 502 is stored locally on the mobile computing device 500, as described above. According to another aspect, the data is stored on any number of storage media that is accessible by the device via the radio 572 or via a wired connection between the mobile computing device 500 and a separate computing device associated with the mobile computing device 500, for example, a server computer in a distributed computing network, such as the Internet. As should be appreciated such data/information is accessible via the mobile computing device 500 via the radio 572 or via a distributed computing network. Similarly, according to an aspect, such data/information is readily transferred between computing devices for storage and use according to well-known data/information transfer and storage means, including electronic mail and collaborative data/information sharing systems.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A head mounted display device, comprising:
a display unit;
a camera, having a fast shutter speed, for generating frames of display data during movement of a user's head;
a memory comprising a frame store for storing a previous frame of displayed information that was sent to the display unit; and
a motion processor in communication with the camera, display unit, and the frame store, wherein the motion processor is operable to:
identify a first area of interest in a current frame of display data, wherein the first area of interest is a first portion of the current frame, wherein the first area of interest is identified by eye tracking the first portion of the current frame at which a user of the head mounted display is looking, wherein a location of the first area of interest moves based on movement of a user's eyes;
identify a second area of interest, similar to the first area of interest, in the previous frame stored in the frame store, wherein the second area of interest is identified by eye tracking a second portion of the previous frame at which the user of the head mounted display was looking;
rotate and translate the second area of interest, from the previous frame stored in the frame store, to match the first area of interest in the current frame;
average the second area of interest with the first area of interest to generate a displayed area of interest to increase light in the displayed area to compensate for the fast shutter speed; and
display the displayed area of interest.

2. The head mounted display of claim 1, further comprising an eye tracker coupled to the motion processor.

3. The head mounted display of claim 2, wherein the first area of interest is identified based on information received from the eye tracker denoting the first area of interest on the display at which the user of the head mounted display is looking.

4. The head mounted display of claim 1, further comprising a second display coupled to the motion processor.

5. The head mounted display of claim 4, further comprising a second camera coupled to the motion processor.

6. The head mounted display of claim 1, wherein the average of the first matched area of interest with the second area of interest is a weighted average.

7. The head mounted display of claim 6, wherein more recent frames are more heavily weighted than older frames.

8. The head mounted display of claim 6, wherein the weighting of a frame is based on the quality of the match between the second area of interest of the previous frame and the first area of interest of the current frame.

9. A system comprising a computing device, the computing device comprising:
at least one processing device in communication with at least one camera, wherein the camera has a fast shutter speed, which causes frames of display data generated from the camera to have low light; and
at least one computer readable data storage device storing instructions that, when executed by the at least one processing device are operative to:
receive an image from the camera;
determine a first area of interest in the image, wherein the first area of interest is a first portion of the current frame, wherein the first area of interest is identified by eye tracking the first portion of the current frame at which a user of the head mounted display is looking, wherein a location of the first area of interest moves based on movement of a user's eyes;
find a comparable second area of interest in a previous frame, wherein the second area of interest is identified by eye tracking a second portion of the previous frame at which the user of the head mounted display was looking;
average the first area of interest in the image with the comparable second area of interest in the previous frame to increase light in the displayed area to compensate for the fast shutter speed; and
display the averaged area of interest embedded within the image from the camera.

10. The system of claim 9 further operative to:
receive eye tracking information, from an eye tracker, containing information on where a user of a head mounted display is looking.

11. The system of claim 10, further operative to:
use the eye tracking information, from the eye tracker, to determine the first area of interest.

12. The system of claim 9, wherein to average the first area of interest in the image with the second area of interest in the previous frame, the system is further operative to:
rotate and translate the second area of interest based on movement of the first area of interest compared to the second area of interest based on movement of the user's eyes; and
average the rotated and translated second area of interest with the first area of interest in the image.

13. The system of claim 9, wherein to average the first area of interest in the image with the second area of interest in the previous frame, the system is further operative to perform a weighted average of the areas of interest.

14. The system of claim 13, wherein the first area of interest in the image is more heavily weighted than the second area of interest.

15. The system of claim 13 wherein the comparable area of interest is weighted based on its similarity to the first area of interest in the image.

16. A method comprising:
receiving a current image from a camera wherein the camera has a fast shutter speed, which causes frames of display data generated from the camera to have low light;
retrieving from a frame store a previous image that was captured by the camera;
determining a first area of interest, wherein the first area of interest is identified by eye tracking a first portion of the current frame at which a user of the head mounted display is looking, wherein a location of the first area of interest moves based on movement of a user's eyes;
finding a comparable second area of interest in the previous image, wherein the second area of interest is identified by eye tracking a second portion of the previous frame at which the user of the head mounted display was looking;
averaging the first area of interest in the current image with the second area of interest in the previous image to create an averaged area of interest, wherein the averaging increases light in the averaged area to compensate for the fast shutter speed; and
display the averaged area of interest.

17. The method of claim 16, further comprising displaying the averaged area of interest within the current image from the camera.

18. The method of claim 17 wherein averaging is performed on a weighted average basis.

19. The method of claim 18 wherein the areas of interest are weighted based on the age of the previous images.

20. The method of claim 18, wherein the weighting is based on the quality of match between the first area of interest with similar areas in the previous images.

* * * * *